(No Model.)
W. LEHMER.
TIRE SHRINKER.
No. 490,751. Patented Jan. 31, 1893.
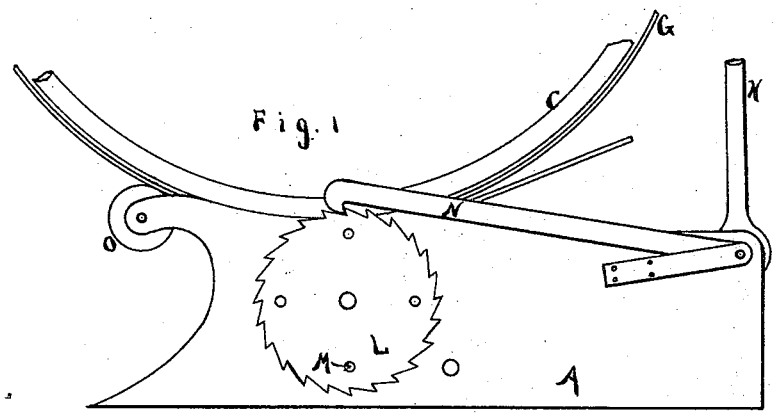
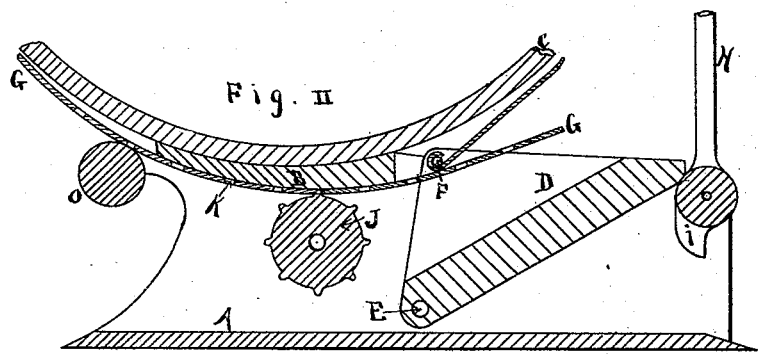
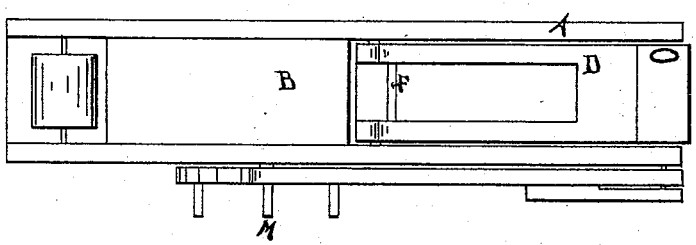
Witnesses
Geo. E. Lawer
E. W. McLean
Inventor
William Lehmer
By Richard F. Denton
attorney

UNITED STATES PATENT OFFICE.

WILLIAM LEHMER, OF CHICAGO, ILLINOIS.

TIRE-SHRINKER.

SPECIFICATION forming part of Letters Patent No. 490,751, dated January 31, 1893.

Application filed July 1, 1892. Serial No. 438,700. (No model.)

*To all whom it may concern:*

Be it known that I, WILLIAM LEHMER, a citizen of the United States, residing at Chicago, in the county of Cook and State of Illinois, have invented new and useful Improvements in Tire-Shrinkers, of which the following is a specification.

My invention relates to improvements in tire-shrinkers in which a perforated band surrounding the wire is operated by a sprocket wheel keyed to the same shaft with a ratchet wheel. Said sprocket wheel engaging with the perforation of the band and the ratchet wheel with a dog to prevent its slipping back; also a supporter for said band consisting of a loose pulley carried by the frame of the machine; also a block on which one end of the band is pivoted to which is given a rocking movement about an axis so as to tighten the band about the tire to be upset.

The objects of my invention are to provide a tire-shrinker, which is simple in construction, positive in its action,—allowing no slip,—easy in its operation, and durable. I attain these objects by the mechanism illustrated in the accompanying drawings, which form a part of this specification, and in which similar letters of reference indicate corresponding parts in all the figures.

Figure —I— is a side elevation of my machine; Fig. —II— is a vertical section and Fig. —III— a plan view of the same.

The base "A" is provided with a projection "B," leaving a concaved top for receiving part of the tire "C." Upon the two sides of the base is pivoted the block "D" at "E" to which block is also fastened a rod on which is pivoted one end of the band "G" that surrounds the tire "C." The block "D" is operated by the lever "H," pivoted also between the sides of the base, and provided with a lug "i," which, when the lever "H" is thrown into a horizontal position causes the block "D" to oscillate about the pivot "E" and tighten the band "G" which is held firm at its other end, as explained in the following specification:

"I" is a sprocket wheel engaging with the perforation "K" in the band "G." Upon the same shaft with the sprocket wheel "J" is keyed the ratchet wheel "L" carrying projection "M" used in revolving the same.

Upon revolving the sprocket wheel "J" the band "G" is made to fit a larger or smaller tire. When once fitted the dog "N" prevents it from slipping back, and then the lever "H" is operated to upset or shrink the tire, which has been previously brought to the proper heat. The loose pulley "O" is used for a supporter for the band "G," and is pivoted between the sides of the base "A."

What I claim as new, and desire to secure by Letters Patent is:

1. In a tire-shrinker, the combination with a base "A" of a perforated band, a sprocket wheel engaging with the band for drawing taut around the tire, a pivoted block connected with the band and mechanism for oscillating the block in such a manner as to tighten the band about the tire.

2. In a tire-shrinker, the combination with a base "A" of a perforated band, a sprocket wheel engaging with the band, and keyed to the same shaft with a ratchet wheel, provided with means for drawing the band taut about the tire, a block connected with the band and mechanism for operating the block substantially as herein shown and described.

3. In a tire-shrinker, the combination of a base "A," a perforated band, a sprocket wheel and ratchet wheel, a dog in connection with the ratchet wheel for locking it and the sprocket wheel in place, a block connected with the band, and mechanism for operating the same substantially as herein shown and described.

4. In a tire-shrinker, the combination of a base "A," a perforated band, a support "O" for the band, a sprocket wheel, a pivoted block connected with the band and mechanism for operating the same substantially as herein shown and described.

WILLIAM LEHMER.

Witnesses:
GEO. E. LAWSON,
E. W. MCLEAN.